US010307697B2

(12) United States Patent
Savoy et al.

(10) Patent No.: US 10,307,697 B2
(45) Date of Patent: *Jun. 4, 2019

(54) FILTER CARTRIDGE

(71) Applicant: KX Technologies LLC, West Haven, CT (US)

(72) Inventors: Blake Savoy, Killingworth, CT (US); Keith D. Johnson, Woodbury, MN (US); Michael J. Sherman, Woodbury, MN (US); Frank A. Brigano, Northford, CT (US); Richard A. Kirchner, Apple Valley, MN (US); Paul A. Pilosi, Minnetonka, MN (US); Jason J. Ness, Victoria, MN (US); Kelly Boudreau, Lake Elmo, MN (US); Stephen P. Huda, Shelton, CT (US); Teddy Howlett, Bridgeport, CT (US); Peter Cook, Terryville, CT (US)

(73) Assignee: KX Technologies LLC, West Haven, CT (US)

( * ) Notice: Subject to any disclaimer, the term of this patent is extended or adjusted under 35 U.S.C. 154(b) by 349 days.

This patent is subject to a terminal disclaimer.

(21) Appl. No.: 14/835,177

(22) Filed: Aug. 25, 2015

(65) Prior Publication Data

US 2016/0220925 A1 Aug. 4, 2016

Related U.S. Application Data

(63) Continuation-in-part of application No. 14/610,373, filed on Jan. 30, 2015.

(Continued)

(51) Int. Cl.
*B01D 27/02* (2006.01)
*B01D 27/08* (2006.01)
(Continued)

(52) U.S. Cl.
CPC ............. *B01D 27/08* (2013.01); *B01D 27/02* (2013.01); *B01D 27/06* (2013.01); *B01D 35/02* (2013.01);
(Continued)

(58) Field of Classification Search
CPC ...... B01D 27/08; B01D 29/96; B01D 35/027; C02F 1/003; C02F 2201/006; C02F 2307/04
See application file for complete search history.

(56) References Cited

U.S. PATENT DOCUMENTS 2,933,188 A 4/1960 Jacula
3,392,837 A 7/1968 Sanzenbacher
(Continued)

FOREIGN PATENT DOCUMENTS

CN 103672163 3/2014
EP 0404573 12/1990
(Continued)

*Primary Examiner* — Patrick J Orme
(74) *Attorney, Agent, or Firm* — DeLio, Peterson & Curcio, LLC; Robert Curcio

(57) ABSTRACT

Filters for use in conjunction with valves of the faucet or spigot type, and to filters for use in devices for withdrawing liquids from containers at relatively low pressures, such as gravity feed jugs or other gravity feed reservoirs. A ¼-turn attachment scheme for connecting a filter cartridge to a gravity feed reservoir, such as within a beverage making/dispensing device.

11 Claims, 13 Drawing Sheets

Related U.S. Application Data

(60) Provisional application No. 62/204,245, filed on Aug. 12, 2015.

(51) Int. Cl.
  *B01D 35/02* (2006.01)
  *B01D 27/06* (2006.01)
  *C02F 1/00* (2006.01)
  *C02F 1/28* (2006.01)

(52) U.S. Cl.
  CPC .............. *C02F 1/003* (2013.01); *C02F 1/283* (2013.01); *C02F 1/286* (2013.01); *C02F 2201/006* (2013.01); *C02F 2307/04* (2013.01)

(56) References Cited

U.S. PATENT DOCUMENTS

| | | | |
|---|---|---|---|
| 3,430,824 A | 3/1969 | Conners et al. | |
| 4,181,243 A * | 1/1980 | Frahm | B67D 3/00 137/550 |
| 4,491,520 A * | 1/1985 | Jaye | C02F 1/002 210/232 |
| 4,995,975 A | 2/1991 | Jacquot et al. | |
| 5,919,365 A | 7/1999 | Collette | |
| 6,193,886 B1 | 2/2001 | Nohren, Jr. | |
| 6,541,055 B1 | 4/2003 | Luzenberg | |
| 6,569,329 B1 * | 5/2003 | Nohren, Jr. | B01D 29/15 210/282 |
| 7,655,112 B2 * | 2/2010 | Koslow | A61L 2/0017 162/157.6 |
| 7,762,429 B2 | 7/2010 | Macler et al. | |
| 8,230,692 B2 | 7/2012 | Moon et al. | |
| 8,377,292 B2 | 2/2013 | Patera et al. | |
| 8,388,841 B2 | 3/2013 | Moretto | |
| D686,296 S | 7/2013 | Melzer | |
| 2005/0072728 A1 | 4/2005 | Chang | |
| 2011/0278207 A1 * | 11/2011 | Swain | C02F 1/003 210/87 |
| 2011/0284585 A1 | 11/2011 | Stewart-Barnett | |
| 2013/0118972 A1 | 5/2013 | Yui | |
| 2013/0213877 A1 | 8/2013 | Lin et al. | |
| 2013/0233890 A1 | 9/2013 | Melzer | |

FOREIGN PATENT DOCUMENTS

| | | |
|---|---|---|
| EP | 0861809 | 4/1995 |
| EP | 1028090 | 1/2000 |
| EP | 1321428 | 12/2002 |
| GB | 2504501 | 2/2014 |
| WO | WO 1994 004245 | 3/1993 |
| WO | WO 1998 005401 | 2/1998 |
| WO | WO 1998 032705 | 7/1998 |
| WO | WO 2012 130329 | 10/2012 |

* cited by examiner

FILTER CARTRIDGE

BACKGROUND OF THE INVENTION

1. Field of the Invention

The present invention relates generally to filters for use in conjunction with valves of the faucet or spigot type, and particularly to filters for use in devices for withdrawing liquids from containers at relatively low pressures, such as gravity feed jugs or other gravity feed reservoirs, and the like. The present invention is further directed to an attachment scheme for connecting a filter cartridge to a gravity feed reservoir, such as within a beverage making/dispensing device.

2. Description of Related Art

Filtered water filter containers, such as jugs or pitchers, generally comprise a receptacle and a removable hopper, which hopper can be supported in or on the receptacle. The hopper is adapted to carry a water filter cartridge which typically comprises a molded container having inlet and outlet slots formed therein to allow water to enter and exit an internal cavity. Reservoirs in beverage making and beverage dispensing units are molded containers that are also applicable.

Most water filter containers, such as countertop pitchers, include a divider that separates the container into two compartments. The divider is generally adapted to early a water treatment device, such as a filter cartridge. The divider is typically positioned in use so that it divides the container into an upper compartment and a lower compartment. Water filter pitchers of this type have been available in the art. For example, WIPO Publication WO 1998005401 of Robinson, et al., titled "A Water Treatment Cartridge and a Water Filter Jug Fitted with such a Cartridge," teaches a water filter pitcher with a divider. In this prior art design, the spout has a fluid outlet in fluid communication with the lower compartment, which is the compartment with the filtered water.

In U.S. Pat. No. 4,181,243 issued to Frahm on Jan. 1, 1980, titled "Device for Filtering Beverages," a filter element is provided at the inlet of a spigot for dispensing beverages from a reservoir or cooler. The filter receiving member or holder is an open, cup-shaped member which is threaded to the inlet shaft of the spigot to act as a fastener for mounting the spigot to the reservoir. The filter element is then inserted into the filter holder by a push fit, and removed therefrom by pulling it out of the cup-shaped member. In this design, however, the filter cartridge is relatively small, and it would have to be even smaller if it were adapted to a water jug, where the outlet tap is located as near as possible to the bottom portion of the container, since the radius of the cup-shaped holder would have to be a little smaller than the distance from the center of the tubular faucet stem to the bottom wall.

In beverage making and/or beverage dispensing units, a reservoir feeds the unit with water upon demand; generally through a gravity feed system. A user fills the reservoir with water prior to use, and upon demand water is allowed to flow from the reservoir through the unit's plumbing to be put to purpose. The interface or junction where the water leaves the reservoir is where filtration may be introduced, since it is a convenient place to separate unfiltered water from an egress point of departure out of the reservoir.

The design and attachment of a filter cartridge within these types of containers is developed herein.

SUMMARY OF THE INVENTION

Bearing in mind the problems and deficiencies of the prior art, it is therefore an object of the present invention to provide novel means for filtering beverages as they are dispensed through a jug container, cooler, spigoted vessel, ice chest, collapsible travel bags, and the like, for consumption.

It is another object of the present invention to provide an improved filter mechanism and filter element for use in beverage making units, beverage dispensing units, and the like, whereby the filter element is easily insertable in and detachable from the remainder of the assembly for quick replacement.

It is another object of the present invention to provide a novel filter element and attachment scheme so arranged in a jug or beverage making/dispensing unit that all water flowing to an outlet must pass through the filter unit, and the remaining water in the jug or reservoir of the beverage making/dispensing units is strictly limited by a low profile design.

The above and other objects, which will be apparent to those skilled in the art, are achieved in the present invention which is directed to a filter assembly for a container comprising: a fluid dispensing spigot having a portion located on the outside of the container, and a portion extending therethrough, such that the spigot is in fluid communication with fluid within the container; and a filter housing having a filter media enclosed therein, a body portion and a housing egress end, the egress end forming a fluid-tight seal with the spigot or with an adapter attached to the spigot, the body portion in fluid communication with the housing egress end and having a plurality of apertures for fluid ingress to the filter media, and forming a fluid tight seal with the spigot by threaded fit; the adapter including a threaded interface for making a fluid tight attachment of the adapter to the spigot.

The filter media may include pleated paper of fibrillated fibers; the fibrillated fibers may further include fibrillated adsorbent cellulose technology.

The filter media may be an extruded carbon.

In a second aspect, the present invention is directed to a filter assembly for a container comprising: a fluid dispensing spigot having a portion located on the outside of the container; an extension member connected to or integral with the spigot, and extending into the container such that the spigot is in fluid communication with fluid within the container; and a filter housing assembly having an angled neck portion and a base portion, the angled neck portion forming a fluid-tight seal with the spigot extension, the base portion in fluid communication with the neck portion, and having a plurality of apertures for fluid ingress to filter media enclosed within the filter housing, wherein the angled neck portion locates the base portion perpendicular from the extension member.

The angled neck portion preferably forms an angle with the base portion and the spigot extension within a range of 0° to 90°.

In a third aspect, the present invention is directed to a filter cartridge assembly for a gravity fed system, comprising: a handle having a handle end cap; a filter core member in mechanical communication with the handle end cap; a lower end cap in mechanical communication with the filter core member and having a connector for mating with a complementary manifold; and a filter media situated about the filter core member and in sealing engagement with the handle end cap at one end and the lower end cap at the other end; such that when the handle is rotated, the handle end cap and the lower end cap are correspondingly rotated mating the lower end cap with the manifold without translating any appreciable rotational forces to the filter media.

The lower end cap includes a top side facing the filter media, a bottom side, and a sidewall, the connector attached to or integral with the sidewall.

The connector comprises angled protrusions extending radially outwards from the sidewall for threadingly engaging with the complementary manifold, the angled protrusions having an angle for seating the filter cartridge assembly to the manifold in about a one-quarter turn revolution of the filter cartridge.

The angled protrusions seat or lower the lower end cap within the complementary manifold when the lower end cap is rotated relative to the complementary manifold.

The lower end cap is rotated approximately ¼-turn to fully seat the lower end cap within the complementary manifold. The lower end cap bottom side includes a cylindrical extension extending axially downwards from the lower end cap bottom side, the cylindrical extension having an orifice therethrough to allow filtered water to flow from the filter media.

The handle end cap is attached to, or integrally formed with, the handle.

BRIEF DESCRIPTION OF THE DRAWINGS

The features of the invention believed to be novel and the elements characteristic of the invention are set forth with particularly in the appended claims. The figures are for illustration purposes only and are not drawn to scale. The invention itself however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-11 of the drawings in which like numerals refer to like features of the invention.

The present invention relates to a standalone point of use, gravity fed water purification device, specifically a jug container, spigoted vessel, beverage making/dispensing unit, and the like, having a filtration unit for filtering fluid therefrom. The filtration unit is designed to remove heavy metals, viruses, microbiological contaminants, and volatile organic compounds, and the like, from fluid such as tap water, and melted ice, so that users may safely dispense drinkable fluid held in large container bodies or reservoirs for either direct use or use within the beverage making/dispensing unit.

Figure 1A:
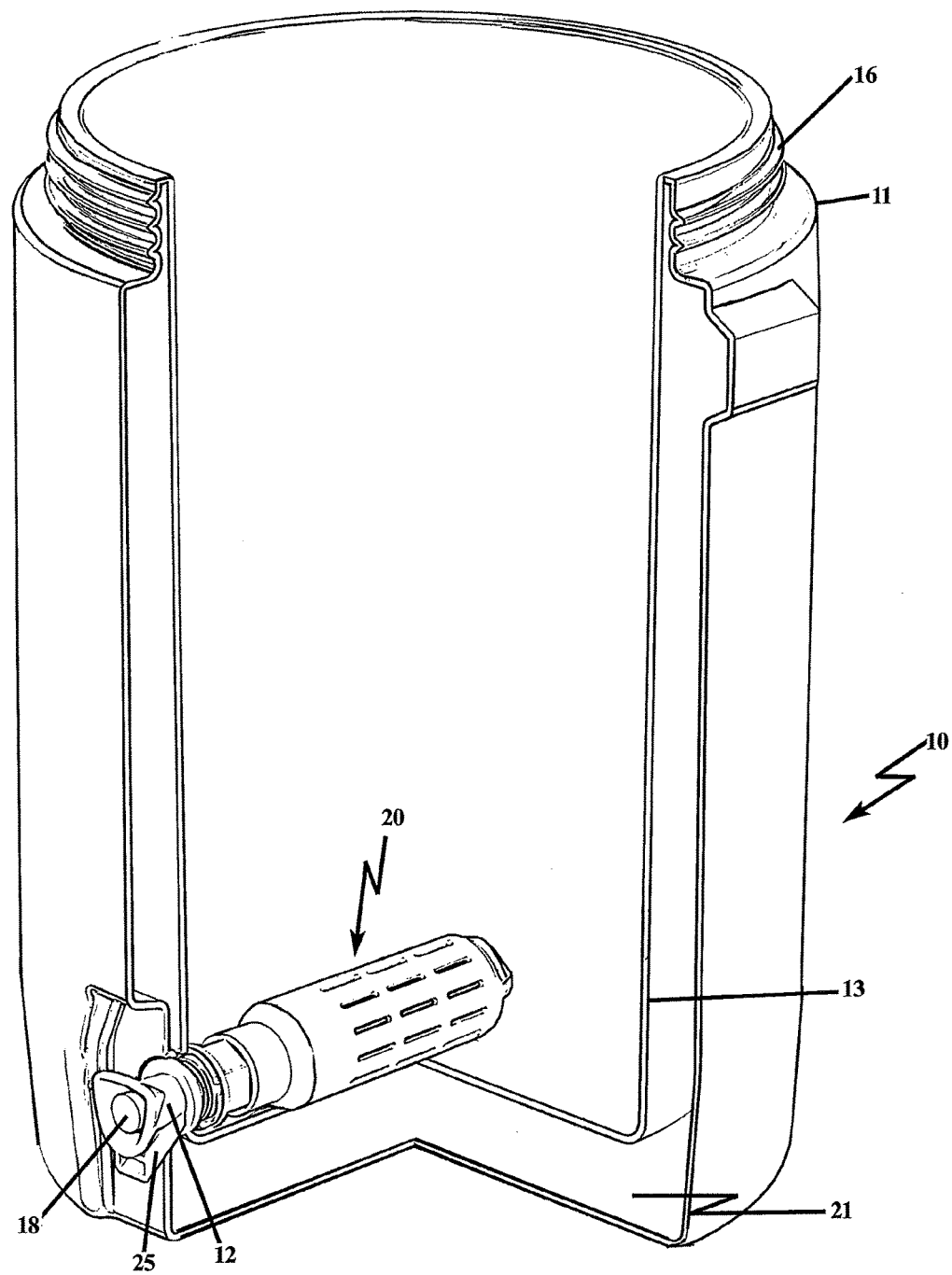
FIG. 1A depicts a cutout sectional view of a jug for containing and dispensing drinkable fluid having a spigot attachable filter housing assembly.

FIG. 1A depicts a cutout sectional view of a jug 10 for containing and dispensing drinkable fluid, such as water. Jug 10 includes a fluid-tight outer wall 11 having a sealingly removable cover or top (not shown) for fluid ingress, and a fluid dispensing spigot or spout 12 generally having an extended portion 14 passing through the outer wall 11 and inner wall or liner 13; spigot 12 being in fluid communication with the fluid in jug 10. Jug 10 may be cylindrical, as shown in FIG. 1, or generally rectangular in shape, although other shapes are not precluded. Jug 10 is designed generally to insulate the fluid inside from external temperature effects, and insulators, such as air gap 21, achieves this insulation function. The fluid enters the jug body by removing the cover or top, in at least one instance from a threaded attachment 16 and pouring fluid into the jug body, and exits via spigot 12 upon activation of a valve in the spigot. In at least one embodiment, spigot activation is achieved by depressing a button 18, which opens a valve within spigot 12, and allows fluid to flow from jug 10 through exit or flow tube 25. The spigot valve retains a leak proof seal when closed.

Figure 1B:
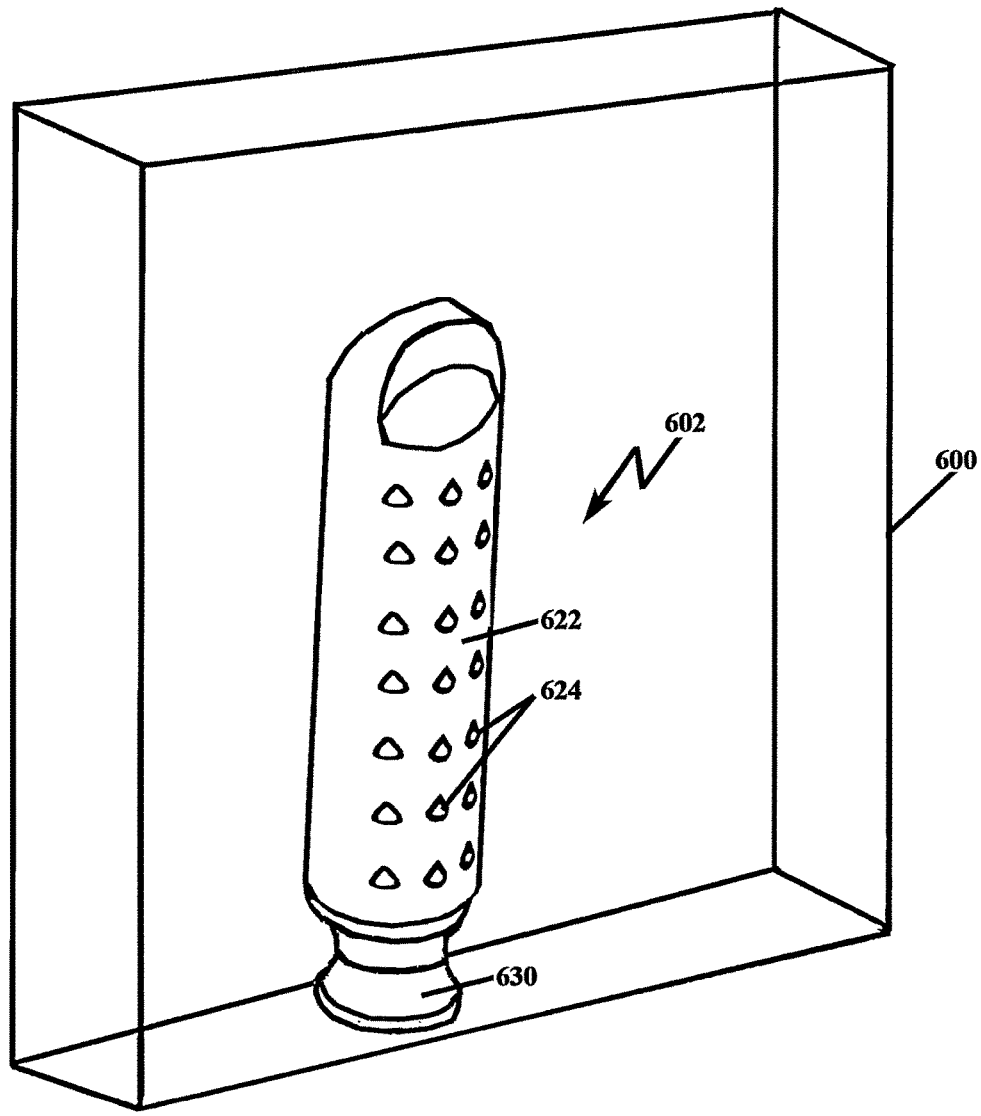
FIG. 1B depicts a reservoir in a beverage making/dispensing unit with an installed filter housing assembly of the present invention.

FIG. 1B depicts a reservoir 600 in a beverage making/dispensing unit with an installed filter cartridge assembly 602. Filter cartridge assembly 602 includes a cartridge body 622 having a plurality of apertures 624 for fluid ingress. The apertures may be any shape (circular, rectangular, etc.) provided there are sufficient openings for fluid ingress within cylindrical body 622, the apertures being preferably designed for optimum fluid flow through the filter media. Apertures 624 are axially placed along the outer surface to allow fluid to enter and come in contact with the entire filter media secured therein. Filter cartridge assembly 602 is mated to an attachment component, such as an adapter 630, which may be secured to the bottom surface of reservoir 600 or secured to a threaded manifold attached to the reservoir bottom surface.

In both exemplary embodiments, it is desirable for a user to have easy access to the filter cartridge in order to facilitate replacement. This requires a quick attachment/detachment scheme. Furthermore, due to tight or restrictive confines of the container, it may be difficult to have the filter cartridge undergo multiple revolutions when attaching or removing the cartridge. A less restrictive attachment scheme is demonstrated whereby only a ¼-turn of the filter cartridge is required.

It is also desirable to have the filter media exposed to as much of the fluid in a gravity feed container (jug or reservoir) as possible, otherwise unfiltered, residual fluid will remain in the storage area below filtration access until more fluid is introduced. A low profile design is demonstrated herein, where more filter media is exposed at a low gravity point then normally can be achieved in the prior art. Furthermore, a filter cartridge assembly is demonstrated where the housing is deliberately removed to provide a lower profile design than can currently be achieved by a filter cartridge in a housing structure.

Figures 2A, 2C:
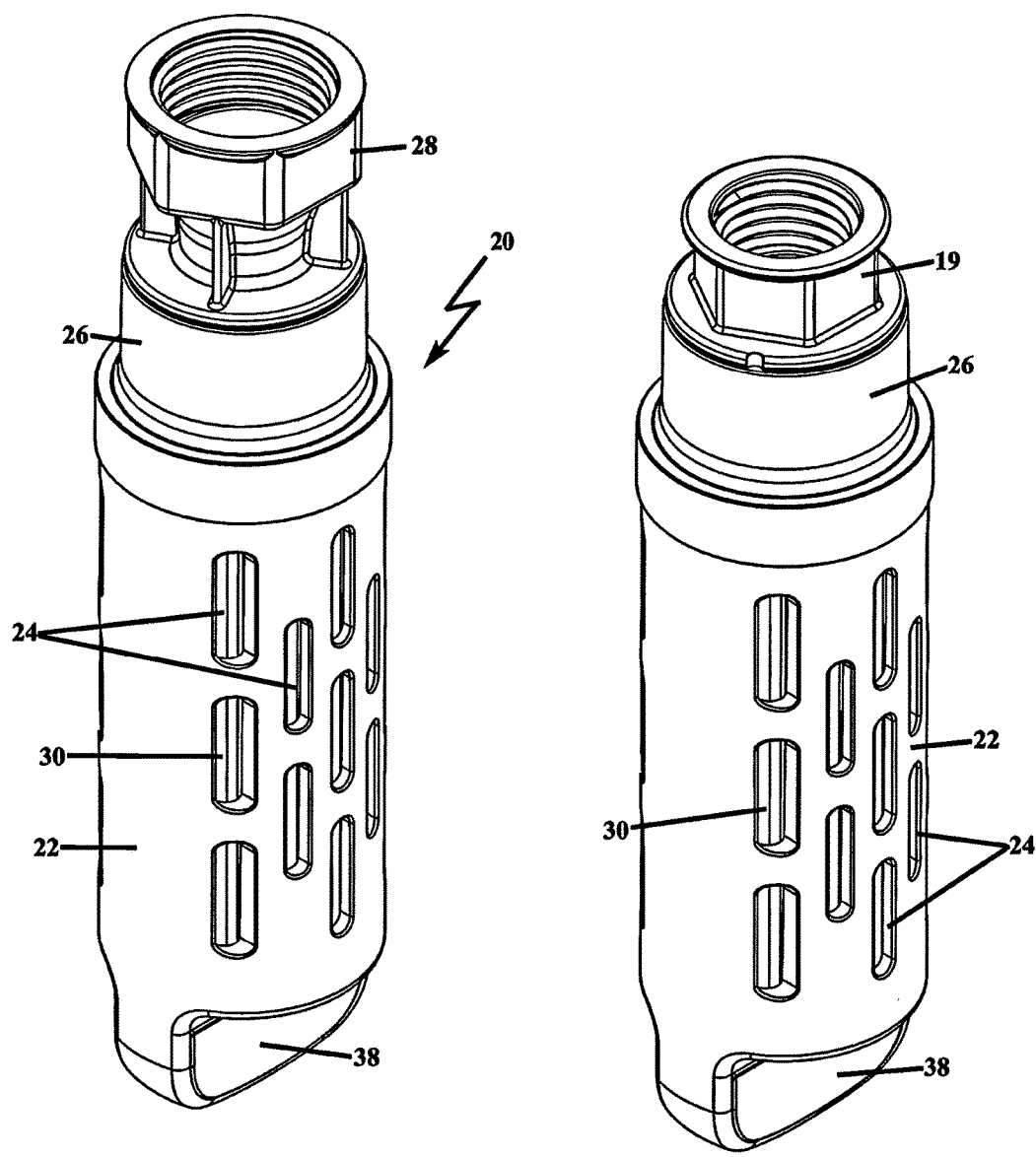
FIG. 2A depicts a side perspective view of a first embodiment of a filter cartridge housing assembly that is attachable by an adapter to a threaded manifold, such as a spigot, the filter cartridge housing assembly having a cylindrical body for enclosing a filter media.
FIG. 2C depicts the filter cartridge assembly of FIGS. 2A and 2B with a shortened adapter for mating with a different threaded manifold configuration.

FIG. 2A depicts a side perspective view of one embodiment of a filter cartridge assembly 20 that is attachable to a threaded manifold, such as a spigot via an extended adapter 28. Filter cartridge assembly 20 includes a cartridge housing body 22 having a plurality of apertures 24 for fluid ingress. Apertures 24 are shown here as elongated ovals, however, the shape is arbitrary. The apertures may be any shape (circular, rectangular, etc.) provided there are sufficient openings for fluid ingress within cylindrical housing body 22, the apertures being preferably designed for optimum fluid flow through the filter media. Apertures 24 are axially placed along the outer surface to allow fluid to enter and come in contact with the entire filter media secured therein.

In this embodiment, cartridge housing body 22 is cylindrical in shape, although other shapes are not precluded, and the invention incorporates other cartridge body shapes herein as preferred embodiments. Cartridge housing body 22 includes a narrow neck portion or annular collar 26 that reduces the outer diameter of the cylindrical body housing ultimately for attachment to the threaded manifold (or spigot 12). Extended adapter 28 is shown attached to neck portion or annular collar 26 for securing to an extension on the spigot that protrudes through the jug wall and liner 13. Extended adapter 28 may be integrally formed with the neck portion 26, or as shown here, removably attachable to both neck portion 26 and the threaded manifold or spigot. In this embodiment, extended adapter 28 may be threadedly attached to a spigot extension or directly to a complementary threaded manifold within a container or reservoir. Other attachment schemes are available and not precluded, such as snap fit, friction fit, compress fit, and the like, provide the attachment scheme is fluid tight. In this embodiment, it is the adapter that attaches to the egress port, which, if threaded, can undergo multiple rotations or revolutions to attach to the complementary threaded spigot or manifold, and once secured, allow at the other end for an easier attachment scheme to remove and replace the filter cartridge housing.

Figure 2B:
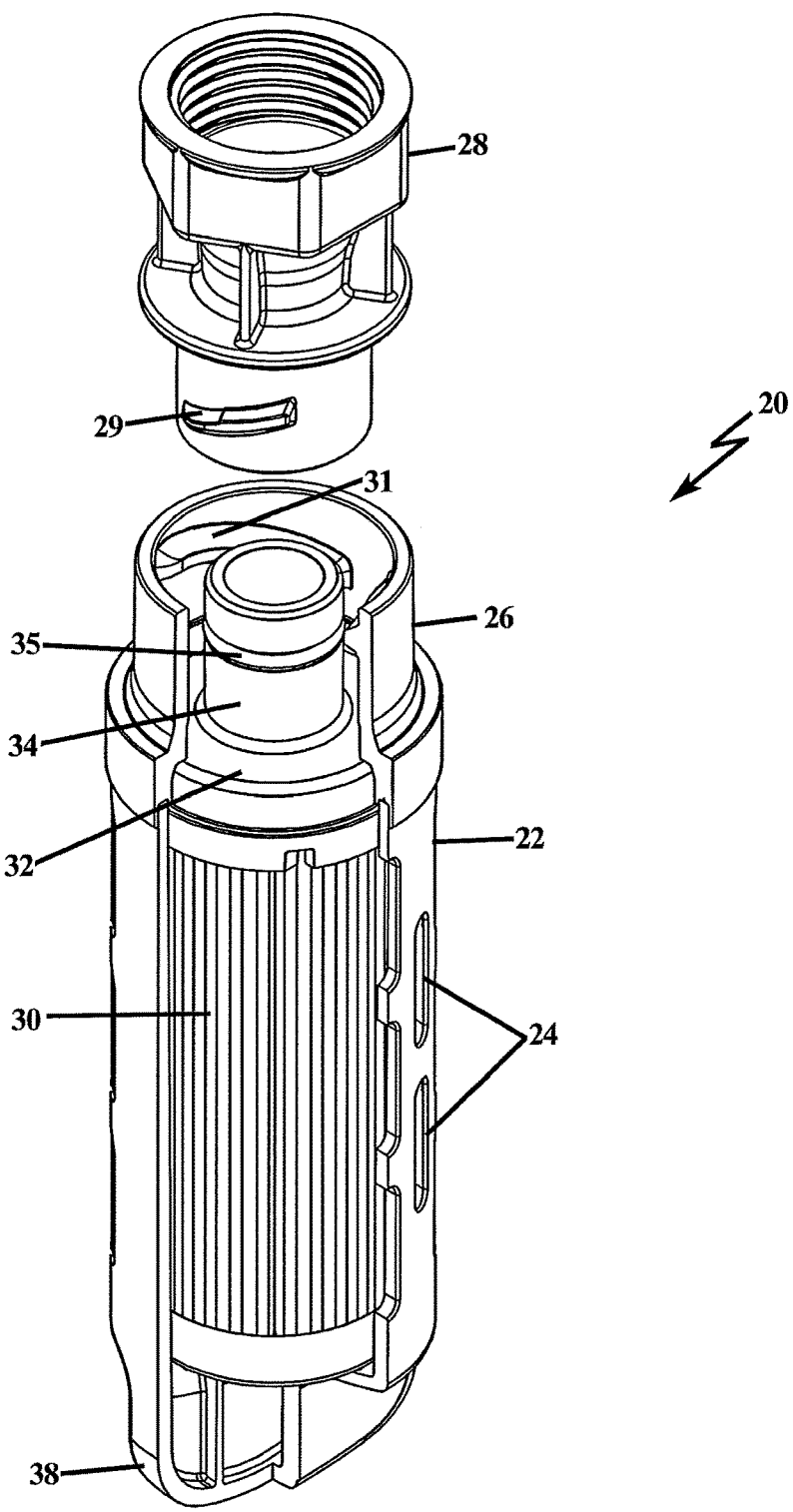
FIG. 2B depicts a cutaway view of a cylindrical filter cartridge housing of FIG. 2A depicting the filter media enclosed therein and the extended adapter for attachment to a threaded manifold.

FIG. 2B depicts a cutaway view of the filter cartridge assembly 20 depicting a filter media 30 enclosed therein. In this embodiment for a filter media design, filter media 30 is depicted with a pleated paper core having a filter media end cap 32 secured to the pleated paper top and bottom surfaces. In other embodiments, filter media 30 may include an extruded carbon block, granulated activated carbon, or any combination thereof. Filter media end cap 32 includes an extension 34 for removable sealing attachment to either extended adapter 28 or directly to a spigot or manifold (not shown) if an adapter is not used. Filter media end cap extension 34 is shown with a groove 35 in the upper portion proximate the egress end for placement of a seal, such as an O-ring seal, for fluid tight interaction with the inner side wall of extended adapter 28.

In this embodiment, extended adapter 28 is threadedly secured to the inside wall of neck portion 26 with diametrically opposed protrusions 29 angled in a direction that secures extended adapter 28 during rotation to complimentary protrusions 31 on annular collar 26. The angled protrusions 29, 31 are designed to accommodate complete seating of the filter cartridge within the adapter by a revolution of approximately only ¼-turn. In doing so, the adapter may remain in place when the filter cartridge is quickly and efficiently removed and replaced.

The connection fitting of the filter cartridge housing includes threaded annular collar 26 for receiving the adapter 28, the threaded annular collar mates with the threads or angled protrusions 29 on adapter 28 such that approximately a ¼-turn of the cartridge housing will completely seat and seal the filter cartridge within the adapter, or if a manifold is designed with an adapter threaded interface, the ¼-turn would secure the filter cartridge to a manifold; that is, the filter cartridge end cap may include threads for securing the filter cartridge directly to a spigot or reservoir manifold. This removes the need for an attachment mechanism to be formed on the cartridge housing, and as will be shown in further detail herein, in some instances removes the need for the cartridge housing all together.

Figure 3:
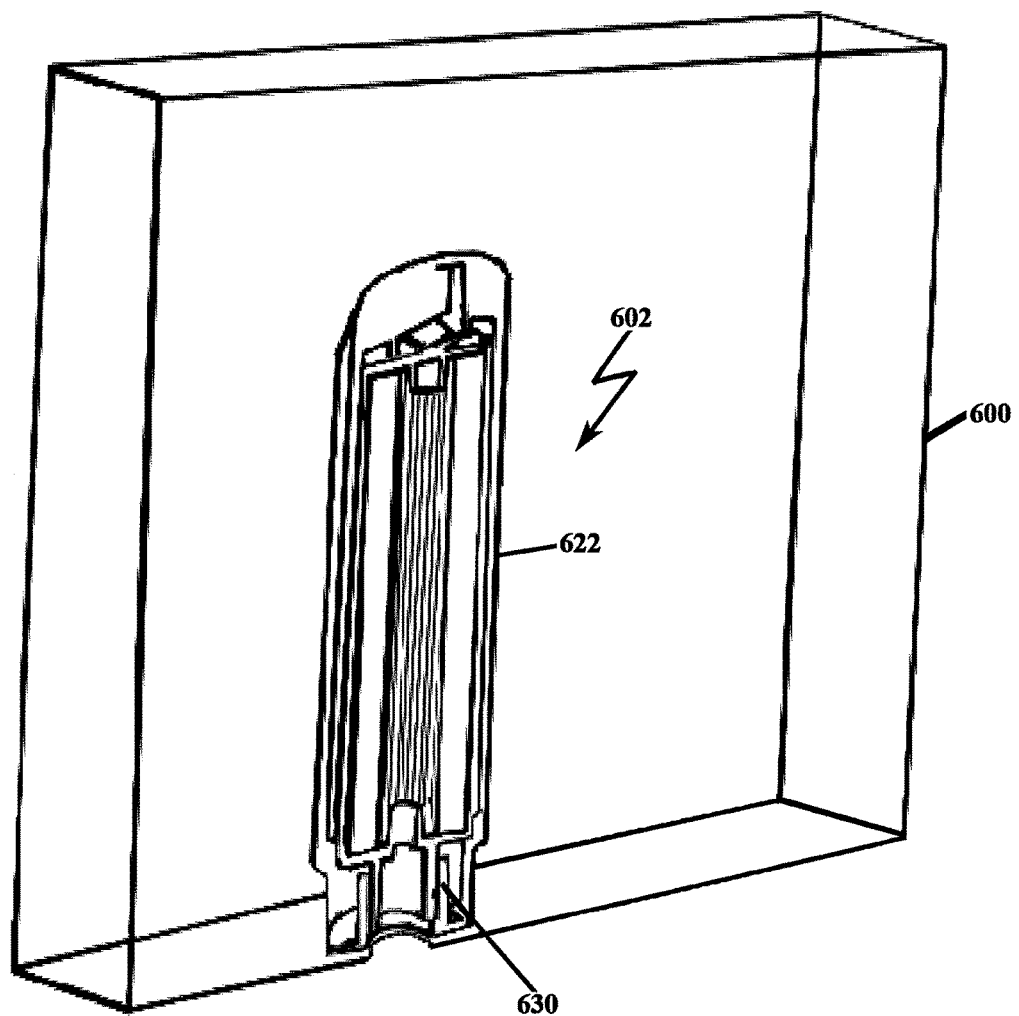
FIG. 3 depicts a cross-section view of the filter cartridge assembly employed in the reservoir of FIG. 1B, such as a beverage making/dispensing unit reservoir, with attachment component or adapter either directly secure to the reservoir bottom surface or floor, or attached by a ¼-turn threaded attachment scheme.

FIG. 3 depicts a cross-section view of the filter cartridge assembly 602 employed in reservoir 600 of FIG. 1B, such as a beverage making/dispensing unit reservoir, with attachment component or adapter 630 either directly secure to the reservoir bottom surface or floor, or having threaded ¼-turn connection with a complementary manifold that is secured to the reservoir floor. The advantage of using this filter cartridge assembly 602 within a beverage making/dispensing unit is the relatively easy attachment and detachment scheme. By adjusting the large angled protrusions forming diametrically opposing threads on the male and female connector, it is possible to pre-determine the amount of rotation necessary to secure and lock the cartridge in place. The angled protrusions or threads on the male and female receptacles, respectively, are angled to lock the cartridge after a quarter-turn of revolution. This requires a more acute angle for rotation than that required simply to screw the cartridge in place through multiple revolutions. Using the ¼-turn technology for the connection threads on the filter cartridge assembly and the complementary manifold, a simple ¼-turn of the assembly will connect/disconnect the filter cartridge to the reservoir of the beverage making/dispensing unit.

Figure 4:
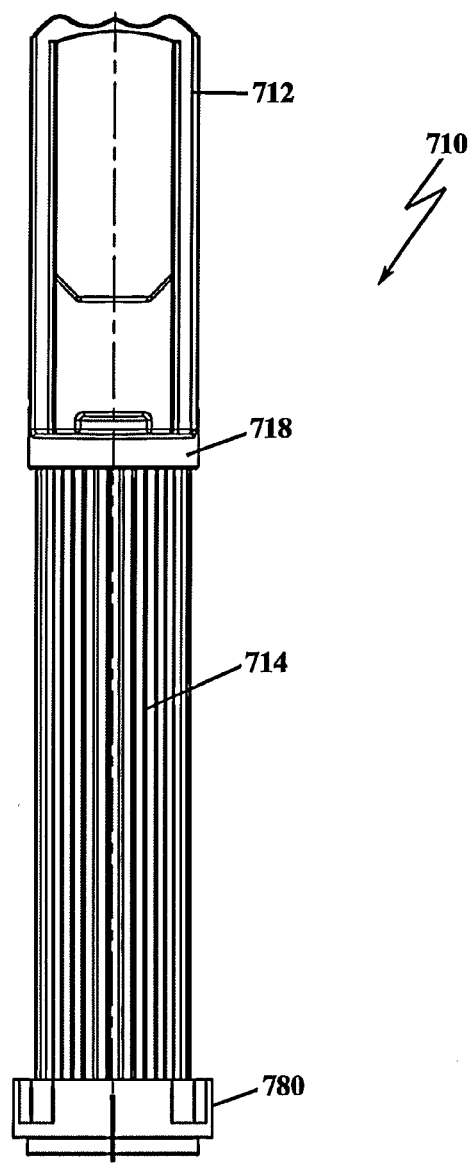
FIG. 4 depicts a filter cartridge assembly that is utilized without a filter cartridge housing, and enables a low profile exposure of the filter media to the bottom surface of a beverage making/dispensing device or a jug container.
Figure 5:
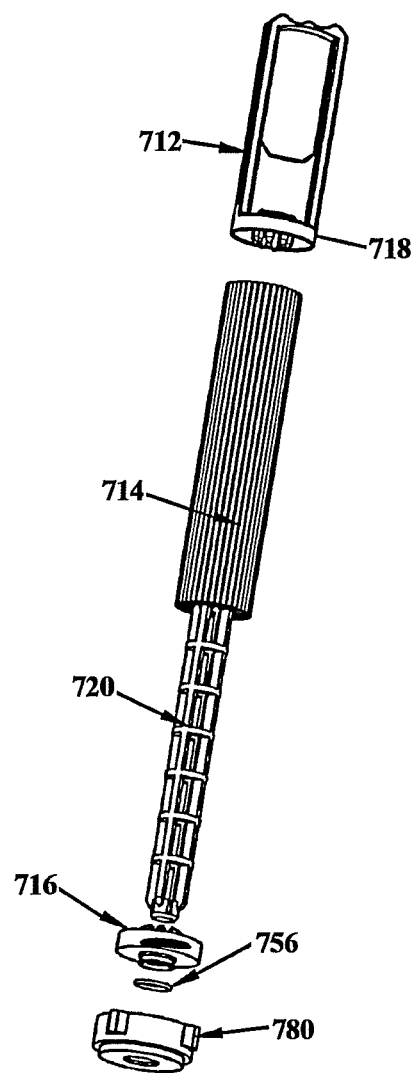
FIG. 5 is an exploded view of the filter cartridge assembly of FIG. 4, depicting a filter core member running axially from the handle (and handle end cap) to the lower end cap.

FIG. 4 depicts a filter cartridge assembly 710 that is utilized without a filter cartridge housing, and enables a low profile exposure of the filter media to the bottom surface of a beverage making/dispensing device or a jug container. In this embodiment, the filter attachment scheme is via threaded, angled protrusions on the outside surface of the lower end cap of the filter media, as opposed to a threaded filter cartridge housing or separate threaded adapter. A handle 712 facilitates easy rotation as well as remove and attachment. The filter media 714 is sealingly attached to an upper end cap 718 and a lower end cap 716 (Ref.: FIG. 5). Lower end cap 716 engages a manifold 780, which is secured to the container or reservoir bottom surface.

FIG. 5 is an exploded view of the filter cartridge assembly 710 of FIG. 4. As shown, a filter core member 720 runs axially from handle 712 (and handle end cap 718) to lower end cap 716. Filter core member 720 is connected to the lower side of handle end cap 718 at one end, and the upper side of lower end cap 716 at the other end. Filter core member 720 supports and assists in centering filter media 714 within filter cartridge assembly 710 without applying torque to the filter media. In this manner, rotation of the lower end cap 716 into a mating manifold 780 is possible absent a filter housing.

Figure 6A:
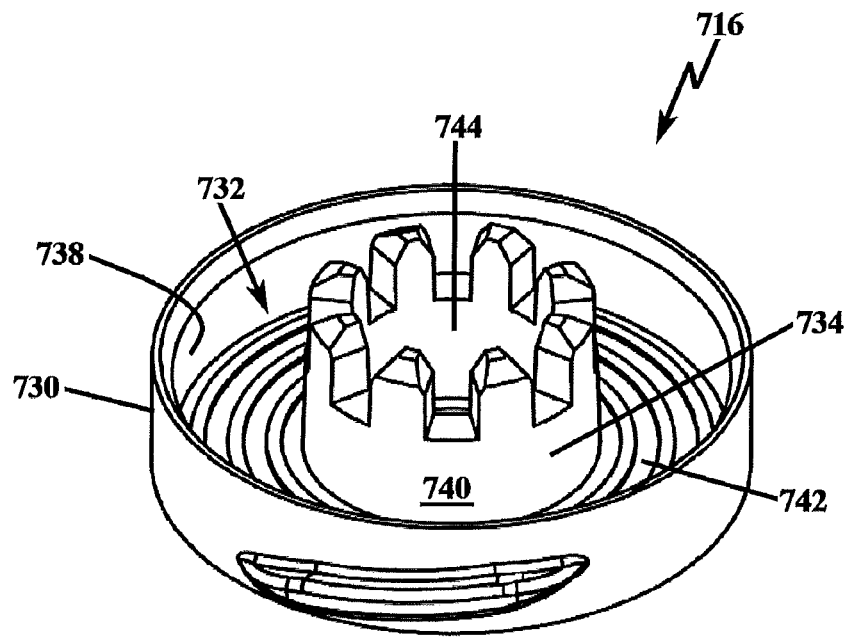
FIG. 6A depicts a top perspective view of a lower end cap of the filter cartridge assembly of FIG. 4, for direct attachment on the top side to a filter media.

FIG. 6A depicts a top perspective view of a lower end cap 716 for direct attachment on the top side to a filter media (not shown). Lower end cap 716 is preferably cylindrically shaped, having an outer wall 730 and an inner cavity 732 formed by the inside surface 738 of outer wall 730 and the outside surface 740 of an interior cylindrical protrusion 734. Inner cavity 732 is formed to receive filter media circumferentially about the bottom portion of the media. Filter media is sealingly engaged with the outside surface 740 of the interior cylindrical protrusion 734, the inside surface 738 of outer wall 730, and/or the bottom surface 742, such that fluid cannot exit through the opening 744 of interior cylindrical protrusion 734 without first going through the filter media.

Figure 6B:
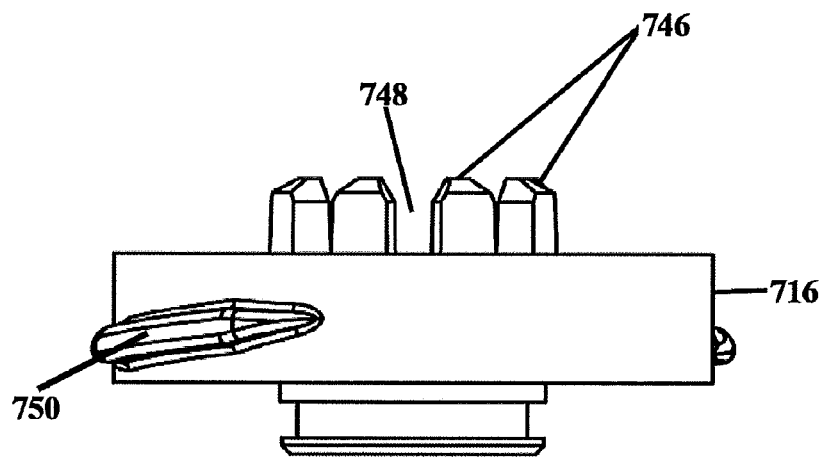
FIG. 6B is a side view of lower end cap of FIG. 6A depicting an angled protrusion for threading engagement with a manifold on either a beverage making/dispensing unit or a jug container.
Figure 6C:
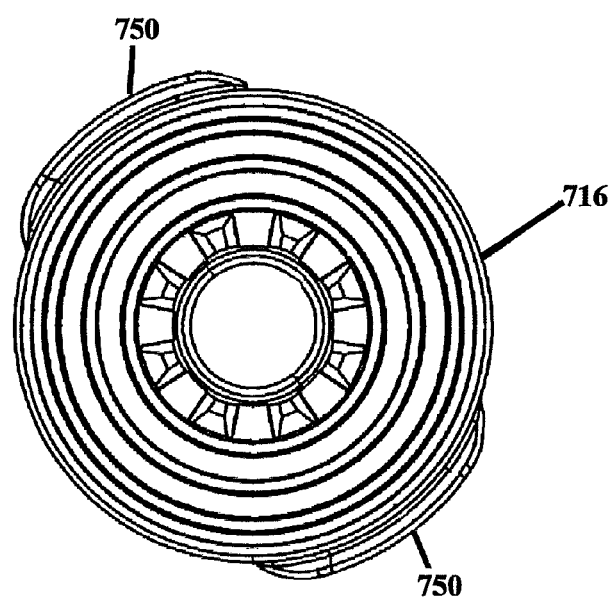
FIG. 6C is a top view of the lower end cap of FIG. 6A depicting the placement of the diametrically opposed angled protrusions for the threaded engagement with a manifold.

Lower end cap 716 includes on its outer periphery two diametrically opposed angled protrusions 750 that form a uniquely angled threaded contact with a complementary threaded connector within a beverage making unit upon rotation of the filter cartridge assembly, which is preferably inclusive of lower end cap 716, a filter media, an upper end cap, a handle, and an intermediate core member for translating rotational energy from the handle to the lower end cap. FIG. 6B is a side view of lower end cap 716 depicting an angled protrusion 750, and FIG. 6C is a top view of lower end cap 716 depicting the placement of the diametrically opposed angled protrusions 750. It is the presence of the diametrically opposed angled protrusions secured to the lower end cap, which is in turn secured to the filter media of a filter cartridge assembly that eliminates the need for the mechanical structure of a filter cartridge housing. Typically, a filter cartridge housing would absorb the torquing or rotational forces for rotating the filter cartridge assembly into a complementary manifold component, while protecting the filter media housed within. In the prior art, the filter media is simply secured (adhesively attached) to end caps at each end, that are held in place by the housing. The filter media and its end caps do not experience any rotational forces since the housing takes all the torque. In contrast, the filter housing is eliminated to remove weight and structure in order to stream-line the footprint of the filter cartridge assembly for a narrow beverage making unit reservoir or, other container, such as a jug. The filter cartridge assembly receives all rotational forces without twisting or applying rotational force to the filter media. This is accomplished by translating the rotational forces from a handle 712 to the handle end cap 718, which in turn is interlocked with a filter core member 720. Filter core member 720 translates the rotational force to lower end cap 716. In this manner, the filter media is relatively free of twisting when handle 712 is rotated. The threaded lower end cap secures the filter cartridge assembly to a complementary manifold 780 in the reservoir or container.

In a preferred embodiment, the respective angled protrusions 750 are designed to allow for a quarter-turn of handle 712 to secure completely lower cap 716 into a receiving, complementary manifold within the reservoir or jug. That is, angled protrusions 750 on lower end cap 716 are designed similarly to the threaded connection described above for the filter cartridge adapter 28 and its receiving manifold. Significantly, there is no need for a filter housing in this embodiment. It should be noted that lower end cap 716 may also include a cylindrical cavity with angled protrusions on the inside (representing a female-type connector), and the manifold 780 may be formed with receiving exterior angled protrusions (representing a male-type connector), such that the attachment scheme may be either a male filter cartridge assembly interfacing with a female manifold component, or a female filter cartridge assembly interfacing with a male manifold component.

In this attachment scheme, the filter media is situated within a reservoir or jug container and is completely exposed, and presents a low profile when attached to a complementary manifold such that the bottom portion of the filter media is in close proximity to the reservoir or jug bottom surface, which upon dispensing leaves only a small amount of unfiltered, residual water in the reservoir or jug. Furthermore, by placing the attachment threads on the lower end cap, it is possible to lower the profile of the receiving manifold as well, which further exposes the lowest portion of the filter media to the water in the reservoir or jug, thus allowing a maximum amount of water to be filtered in a gravity fed system.

In the event that a filter cartridge housing is desired, as may be the case in a jug application in order to keep the user from directly touching the filter media, a handle or flange is preferable in order to rotate the filter cartridge into place and grasp the filter cartridge by means other than the filter media. For a jug filter application, as depicted in FIGS. 2A-2C, the opposite end of filter cartridge housing 20 includes a flange or handle 38 to facilitate grasping and turning the filter cartridge assembly into place within the container or reservoir. This is especially useful when filter cartridge housing 20 and adapter 28 are threadedly connected to the extension portion 14 of spigot 12, or to a manifold within a reservoir. Flange or handle 38 is depicted as a flat, hemispherical tab for grasping by hand; however, other shapes are not precluded provided the function of grasping and rotating the filter cartridge assembly into place is not adversely affected. The flat or face portion of flange or handle 38 may be used to provide for identification purposes such as name brand recognition or other salient markings. The markings may be provided by an adhesive label or may be formed during the molding process of the filter cartridge housing.

Similarly, in the embodiment that eliminates the filter housing, as shown in FIG. 4, handle 712 is depicted; however, it is understood that other handle shapes and sizes are envisioned provided the handle is accessible within the beverage making unit for facilitating removal and replacement of the filter cartridge assembly. The bottom side (filter media side) of handle 712 includes a handle end cap 618, which is similar to the upper side or filter media side of lower end cap 716, insomuch as both receiving sides of the end caps are adapted to receive the filter media in a manner that allows for sealing attachment between each end cap and the filter media. The sealing intent being to secure the filter media to the end caps so that ingress fluid cannot exit the filter system without having passed through the filter media.

FIG. 2C depicts the filter cartridge assembly 20 with a shortened or smaller adapter 19 for mating with a different spigot configuration. Other adapter shapes and sizes may be utilized for attachment with diverse spigot designs.

Figure 7:
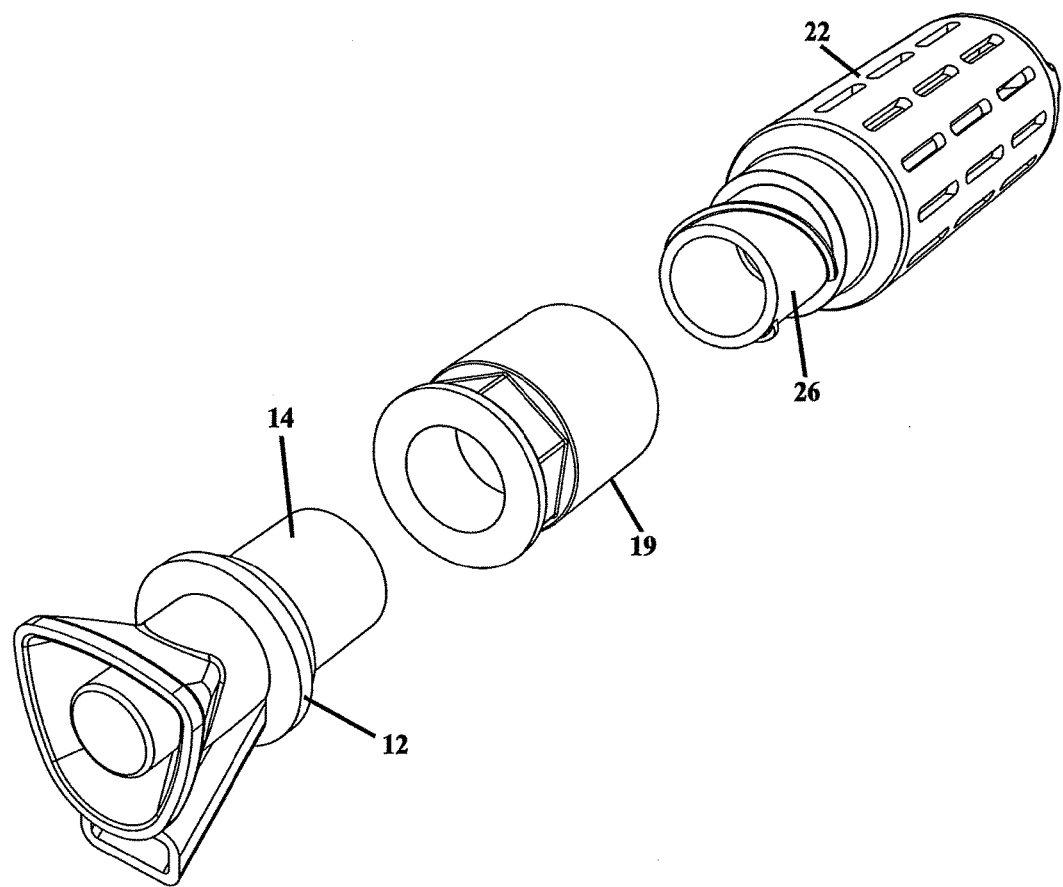
FIG. 7 depicts an exploded view of the filter cartridge assembly of FIG. 1A.

FIG. 7 depicts an exploded view of the filter cartridge assembly 20 of this first embodiment with spigot 12. Filter cartridge housing body 22 attaches via shortened adapter 19 to spigot 12 at spigot extension portion 14. In this manner, spigot 12 is sealingly engaged to adapter 19. The engagement of adapter 19 to spigot extension portion 14 must be a fluid tight seal to ensure unfiltered fluid does not enter the egress line of the spigot without first being filtered. This fluid tight seal may be employed as a threaded engagement or other form of sealing junction, such as a friction fit, snap fit, press fit, etc., provided a fluid tight function is achieved. Each adapter is designed to attach in a fluid tight matter to spigot extension portion 14. Various spigot designs will require different attachment schemes, and the flexibility of the present design to accommodate different adapters provides for diverse jug applications.

Figure 8:
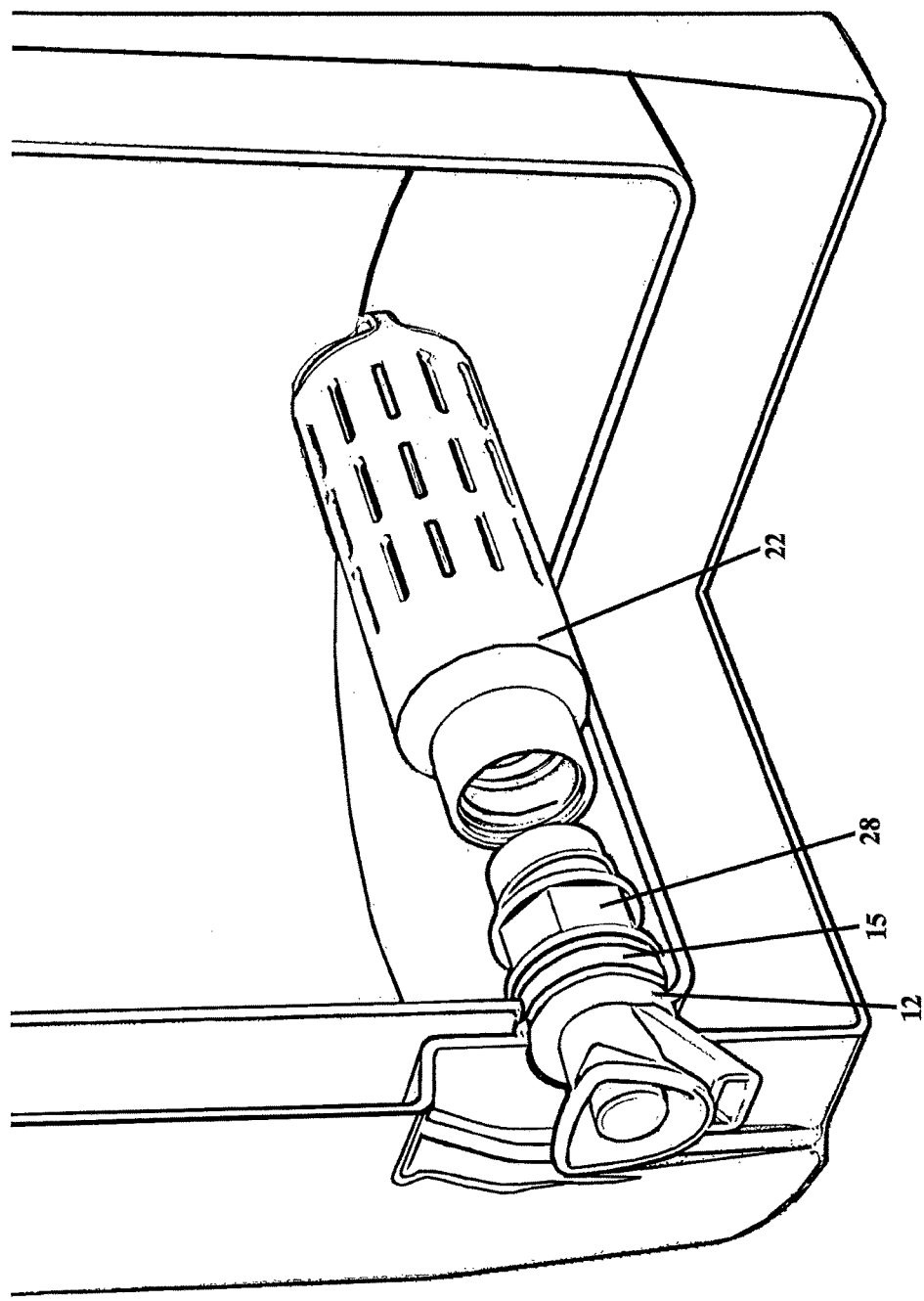
FIG. 8 depicts an exploded view of filter cartridge assembly of FIG. 1A with the spigot sealingly attached to the container liner by a gasket.

FIG. 8 depicts an exploded view of filter cartridge assembly 20 with spigot 12 sealingly attached to liner 13 by a gasket 15, for example an O-ring seal. Adapter 28 is preferably threadedly attached to spigot extended portion 14, and when attached, serves to compress gasket 15 against the liner 13 wall.

Once the adapter/spigot combination ion is secured to the liner wall, cartridge housing body 22 may be rotatably inserted on to the adapter 19, 28. Conversely, the adapter may first be attached to the cartridge body and then the combination rotatably inserted to spigot extended portion 14. The former combination for attachment is an easier method for attaching the adapter to the spigot extended portion if the adapter-spigot extended portion mating comprises a multiple thread design.

Figure 9:
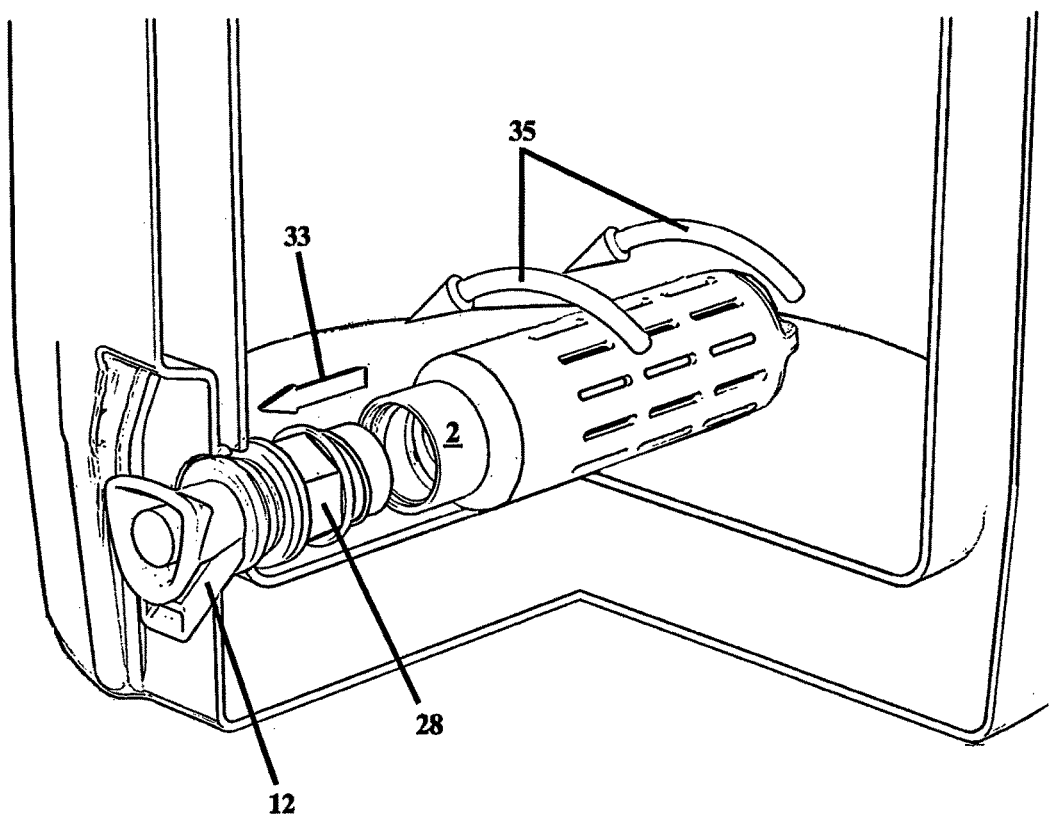
FIG. 9 depicts the insertion direction and rotational direction for attaching the cartridge body of the filter cartridge assembly of FIGS. 2A and 2B to a secured adapter/spigot combination.

FIG. 9 depicts the insertion direction and rotational direction for attaching cartridge housing body 22 to the secured adapter/spigot combination. Arrow 33 indicates the insertion direction, and arrows 35 indicate the rotation direction.

As depicted in the preferred embodiments, filter cartridge housing body 22 or filter cartridge assembly is preferably a cylindrically shaped structure. If the filter media is in the form of paper, preferably the paper employs fibrillated adsorbent cellulose technology (FACT®) produced by KX Technologies LLC of West Haven, Conn., although other filter media may be utilized, and the present invention is not precluded from incorporating different filter media designed to target various contaminants and/or diseases.

Depending upon the positioning of spigot 12 at the bottom portion of the inside container, filter housing assembly 20 may be sufficiently elevated so that attachment to the spigot threaded connector can be achieved by simply rotating filter housing assembly 20 into place on threaded engagement of spigot extended portion 14. Conversely, if the positioning of spigot 12 is too close to the bottom port on of the inside container, it may be necessary to employ a different filter housing shape, as will be shown in a separate embodiment herein, or a rotatable spigot, or to employ a filter media with a threaded connecting lower end cap that can be directly received into a manifold or low profile adapter.

Figure 10:
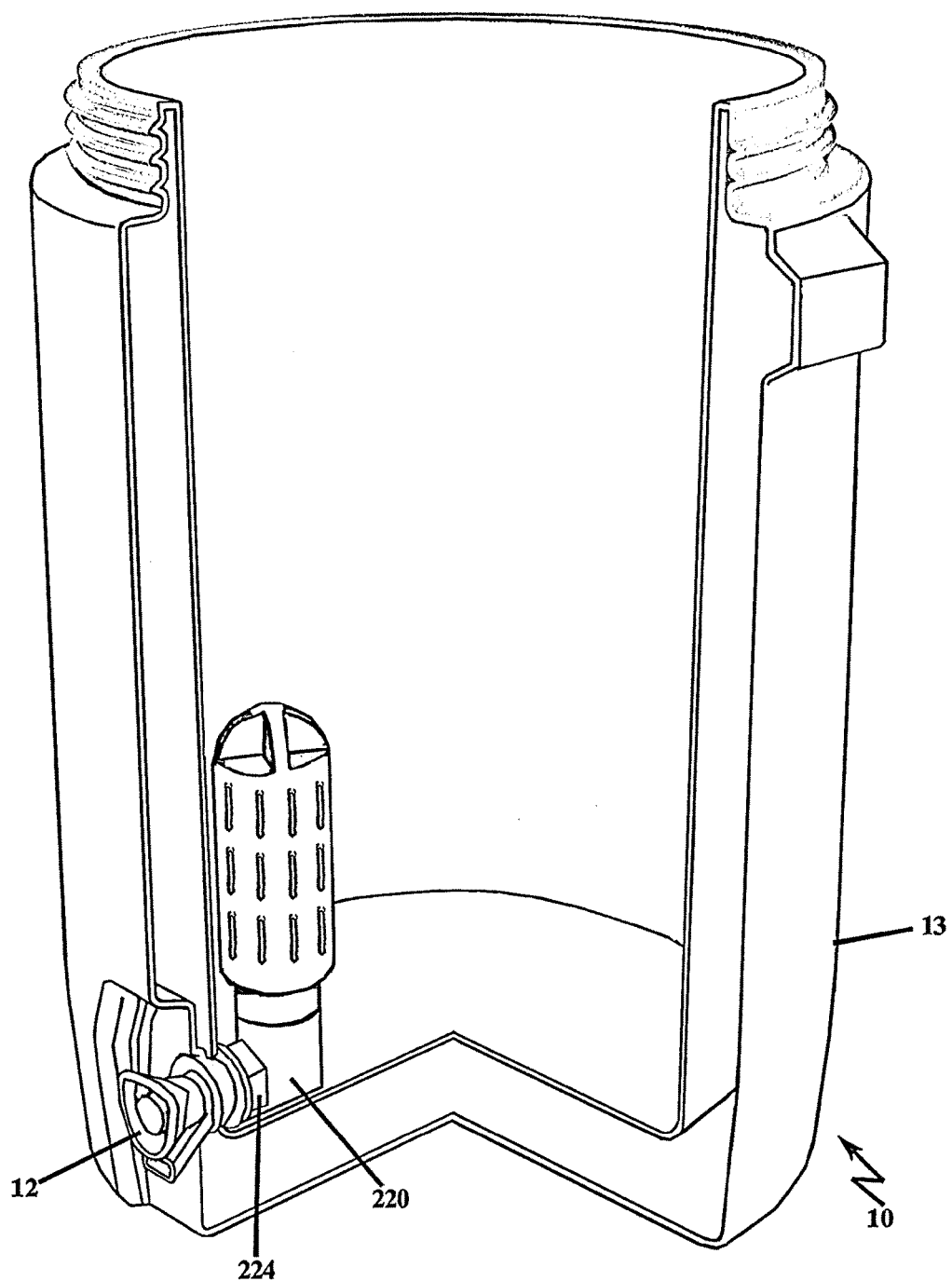
FIG. 10 depicts a cutout sectional view of a jug for containing and dispensing drinkable fluid, and having an angled spigot attachable filter housing assembly for filtering fluid upon egress.

FIG. 10 depicts a cutout sectional view of jug 10 for containing and dispensing drinkable fluid, and having a spigot attachable filter housing assembly 200 for filtering fluid upon egress. Filter housing assembly 200 is similar to filter housing assembly 20 insomuch as it has a neck portion 220 and a base portion 210 that encompasses filter media therein. Base portion 210 is preferably a cylindrically shaped structure having apertures 212 axially placed along its outer surface to allow fluid to enter and come in contact with the filter media secured therein. Unlike the embodiment represented by FIGS. 1 and 2, filter housing 200 has an angled neck portion 220, which is preferably formed at a right-angle allowing base portion 210 to be placed either axially upwards in relation to spigot 12, or horizontal against the bottom surface of jug liner 13. Other angles are not precluded by the design, and angles greater than 90° would allow the filter cartridge to extend further within the cavity of the jug, radially inwards.

Angled neck portion 220 is shown attached to a threaded portion of spigot 12 by a secured, freely rotatable nut 224. This attachment scheme may also be accomplished by a friction, snap fit, or press fit, and may include resilient seals to maintain a water tight seal.

Figure 11:
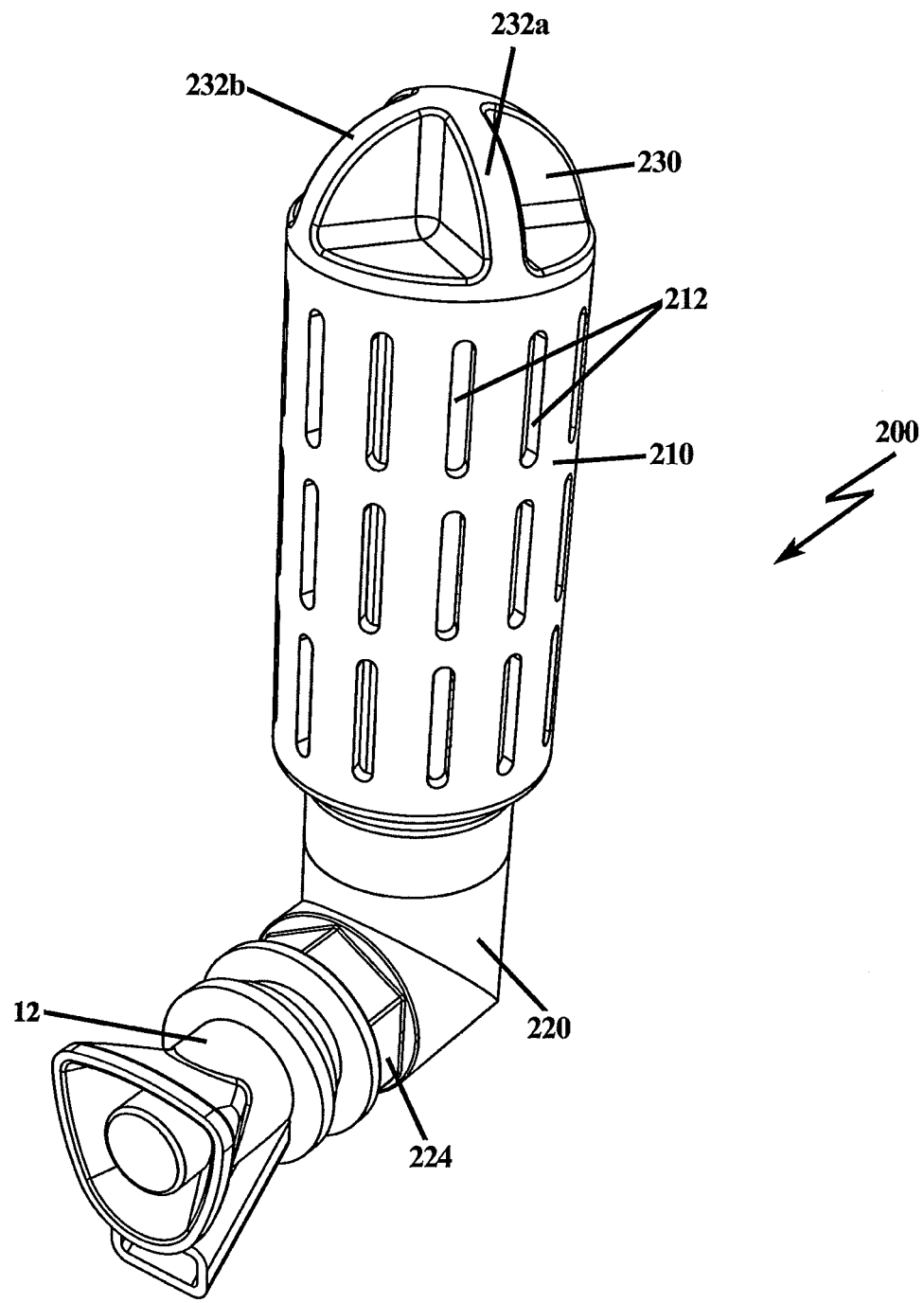
FIG. 11 depicts a side perspective view of the spigot attachable filter housing assembly of FIG. 10 with an angled attachment to a spigot.

FIG. 11 depicts a side perspective view of spigot attachable filter housing assembly 200 with spigot 12. In this position, base portion 210 is mounted vertically or in the axial direction with respect to jug 10. Freely rotatable nut 224 may be loosened to allow base portion 210 to mount horizontally with the bottom of jug filter inner liner 13 if there is sufficient room in the jug to accommodate this rotation. Once rotated, nut 224 is then tightened to secure the filter housing assembly 200 in a fluid tight seal.

As noted in FIG. 11, base portion 210 has attached thereto (or integral therewith) a handle or grip 230 to facilitate the attachment and removal of the filter cartridge from the angled neck portion 220. For exemplary purposes, handle 230 includes two segmented hemispherical ribs 232a,b that join at the center of base portion 210. The interlocking ribs form indented seats for finger placement, which enables a user to rotate easily the filter cartridge into place. Other handle designs, such as handles 307, 407 discussed herein, may be employed, and any specific grip that facilitates the user's grasp and/or rotation of the filter cartridge is not precluded by the present invention.

The present invention presents a plurality of embodiments for filter cartridge assemblies that may be utilized for jug filter designs and/or beverage making/dispensing units, which enable unfiltered fluid to be filtered upon exit of the container or reservoir. The filtering is performed by a filter cartridge housing that may be mounted to the extended post of a spigot that extends through a container liner, or by a housing-less filter cartridge design where the lower end cap, sealingly secured to the filter media, is removably attached to a complementary manifold secured within the lower portion of the reservoir or container.

The present invention further relates to an attachment scheme whereby the angled protrusions on the filter cartridge assembly and the complementary angled protrusions on the accompanying manifold are designed with a much more angled mating surface such that only a one-quarter turn revolution of the filter cartridge is necessary to achieve complete attachment of the cartridge to the manifold.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A filter assembly for a container comprising:
a fluid dispensing spigot having a portion located on the outside of said container, and a portion extending therethrough, such that said spigot is in fluid communication with fluid within said container and forms a fluid tight seal with said container; and
a cylindrical filter housing rotatably secured to, and coaxial with, said spigot or an adapter attached to said spigot, and having a filter media enclosed therein, a body portion, a handle end capping said filter media, and a housing egress end opposite said handle end, said egress end forming a fluid-tight seal with said spigot or with said adapter attached to said spigot, said body portion in fluid communication with said housing egress end and having a plurality of apertures opening in a direction radially outwards from a center axis of said cylindrical filter for fluid ingress to said filter media, and forming a fluid tight seal with said spigot by threaded fit, such that removal of said filter media requires rotation of said handle end of said filter housing and removal of said filter housing without affecting said fluid-tight seal between said spigot and said container;
wherein said adapter includes a threaded interface for making a fluid tight attachment of said adapter to said spigot.

2. The filter assembly of claim 1 wherein said filter media includes pleated paper of fibrillated fibers.

3. The filter assembly of claim 1 wherein said filter media includes extruded carbon.

4. A filter assembly for a container comprising:
a fluid dispensing spigot having a portion located on the outside of said container;
an extension member connected to or integral with said spigot, and extending through a wall of said container and into said container such that said spigot is in fluid communication with fluid within said container; and
a filter housing assembly having a filter housing and a right-angled neck portion forming a right-angle with respect to said extension member at a first end and a cylindrical base portion at a second end, said right-angled neck portion having said first end coaxial with said extension member, and forming a fluid-tight seal with said spigot extension member at said first end, said filter housing threadably and rotationally attached to said right-angled neck portion, said right-angled neck portion threadably attached to said spigot extension member, said base portion in fluid communication with said right-angled neck portion, and having a plurality of apertures for fluid ingress to filter media enclosed within said filter housing, wherein said right-angled neck portion locates said base portion perpendicular from said extension member.

5. A housingless filter cartridge assembly for a gravity fed system, comprising:
a handle having a handle end cap;
a filter core member attached to, and in mechanical communication with, said handle end cap, and extending from said handle end cap to a lower end cap;
said lower end cap attached to, and in mechanical communication with, said filter core member and having a connector for mating with a complementary manifold; and
a cylindrical filter media having sidewalls circumferentially exposed to ingress fluid in the absence of a filter housing, and having an open axial center for receiving said filter core member in said axial center, and forming a sealing engagement with said handle end cap at one end and said lower end cap at the other end, wherein said cylindrical filter media is directly exposed to ingress fluid without an intermediate housing sidewall therebetween;
such that when said handle is rotated, said handle end cap and said lower end cap are correspondingly rotated mating said lower end cap with said manifold.

6. The filter cartridge assembly of claim 5 wherein said lower end cap includes a top side facing said filter media, a bottom side, and a sidewall, said connector attached to or integral with said sidewall.

7. The filter cartridge assembly of claim 5, wherein said connector comprises angled protrusions extending radially outwards from said sidewall for threadably engaging with said complementary manifold, said angled protrusions having an angle for seating said filter cartridge assembly to said manifold in about a one-quarter turn revolution of said filter cartridge.

8. The filter cartridge assembly of claim 7 wherein said angled protrusions seat or lower said lower end cap within said complementary manifold when said lower end cap is rotated relative to said complementary manifold.

9. The filter cartridge assembly of claim 5 wherein said lower end cap is rotated approximately ¼-turn to fully seat said lower end cap within said complementary manifold.

10. The filter cartridge assembly of claim 5 wherein said lower end cap bottom side includes a cylindrical extension extending axially downwards from said lower end cap bottom side, said cylindrical extension having an orifice therethrough to allow filtered water to flow from said filter media.

11. The filter cartridge assembly of claim 5 wherein said handle end cap is attached to, or integrally formed with, said handle at one end, and sealingly engaged with said filter media at the other end.

* * * * *

UNITED STATES PATENT AND TRADEMARK OFFICE
CERTIFICATE OF CORRECTION

PATENT NO. : 10,307,697 B2
APPLICATION NO. : 14/835177
DATED : June 4, 2019
INVENTOR(S) : Blake Savoy et al.

Page 1 of 1

It is certified that error appears in the above-identified patent and that said Letters Patent is hereby corrected as shown below:

In the Specification

In Column 1, Line 26, delete "early" and substitute therefore --carry--

In Column 9, Line 59, delete "port on" and substitute therefore --portion--

Signed and Sealed this
Third Day of September, 2019

Andrei Iancu
*Director of the United States Patent and Trademark Office*